Nov. 18, 1969   L. G. GHEEN   3,478,780
IRRIGATION VALVING
Filed Aug. 7, 1967   2 Sheets-Sheet 1
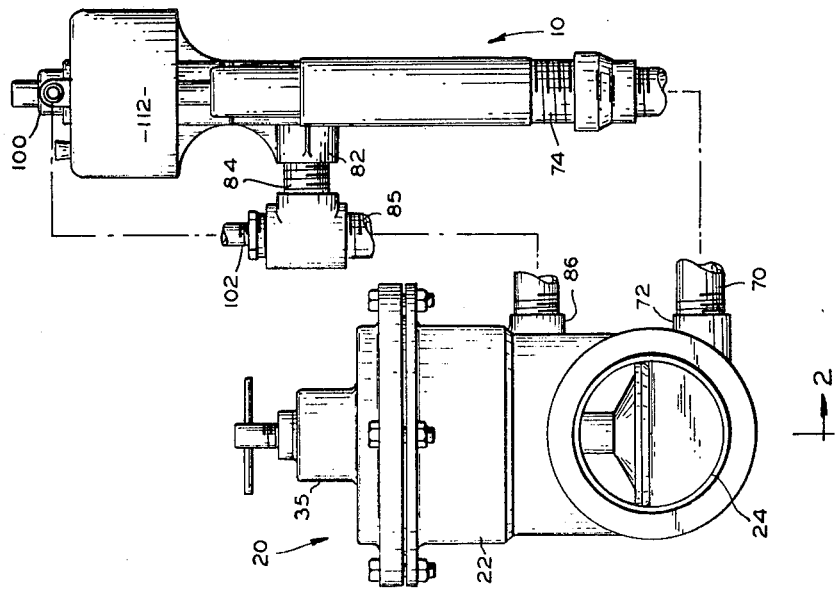
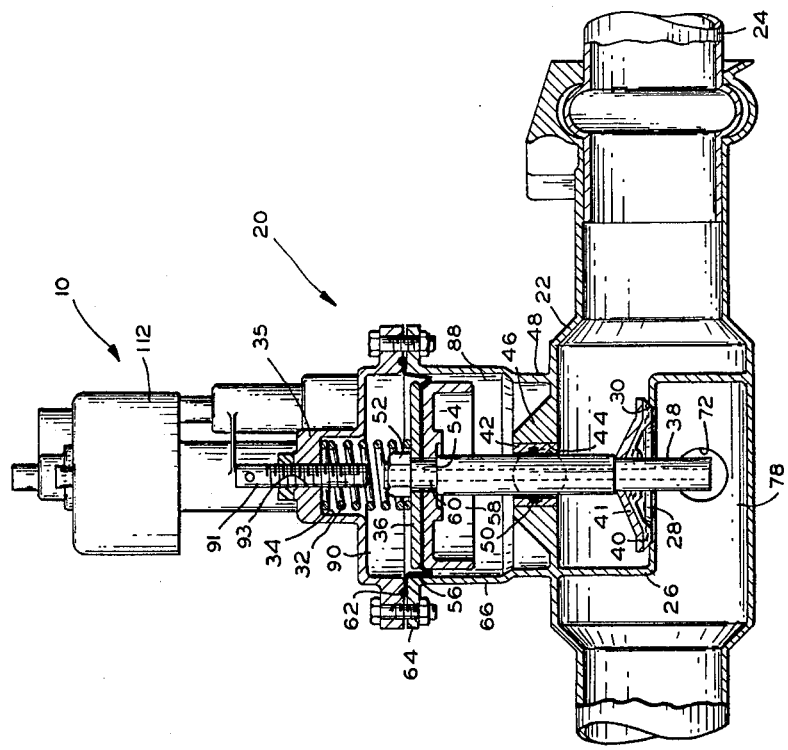
LYNDLE G. GHEEN
INVENTOR
BY
BUCKHORN, BLORE, KLARQUIST & SPARKMAN
ATTORNEYS Nov. 18, 1969  L. G. GHEEN  3,478,780
IRRIGATION VALVING
Filed Aug. 7, 1967  2 Sheets-Sheet 2
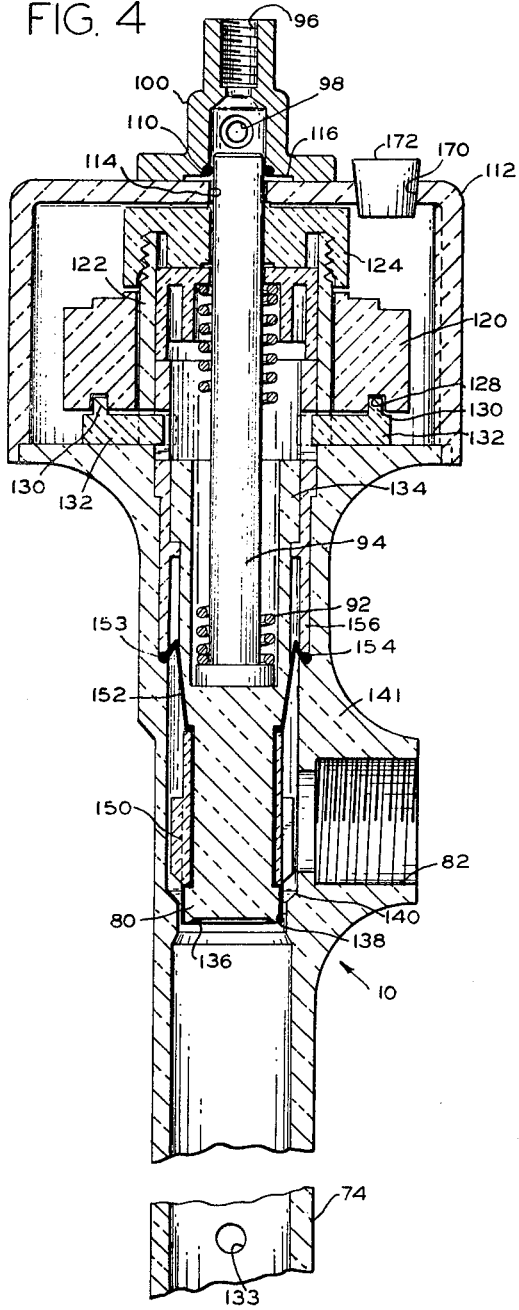
LYNDLE G. GHEEN
INVENTOR
BY
BUCKHORN, BLORE, KLARQUIST & SPARKMAN
ATTORNEYS United States Patent Office 3,478,780
Patented Nov. 18, 1969

3,478,780
IRRIGATION VALVING
Lyndle G. Gheen, Eugene, Oreg., assignor to R. H. Pierce Manufacturing Company, Eugene, Oreg., a corporation of Oregon
Filed Aug. 7, 1967, Ser. No. 658,851
Int. Cl. A01g 25/00; F16k 11/00
U.S. Cl. 137—624.18                10 Claims

ABSTRACT OF THE DISCLOSURE

A stepping valve 10 operable by intermittent cutoffs of water pressure in a water supply opens after a predetermined number of pulses. The stepping valve may be used to directly control water flow of a sprinkler or, for larger sprinkler installations, may be provided with a vent valve 100 cemented to a cap thereof and a valve rod 94 used as a pilot valve to control a large valve 20. The valve 10 has a semi-soft valve member 80 with a cupped head 136 which acts like a pump leather, and the valve member 80 is stiffened in its central section by a sleeve 150. The main valve has a hollow valve stem 38 secured to and extending through a rolling diaphragm which normally holds the stem 38 to close off a supply chamber 78. Normally, when the valve 10 is closed, the vent valve 100 is open and there is no pressure in chamber 88 in the main valve 20 and there is pressure in the chamber 90. This with spring 32 keeps the valve 20 closed. The stepping valve 10 is stepped by a connection 70 to the supply chamber 78 of the main valve 20, and is stepped to an actuating condition opening port 82 of the valve 10 and closing the vent valve 100 to connect the chamber 88 in the valve 20 to the supply chamber 78. This causes the valve 20 to open. Then, on the next cutoff of pressure to the chamber 78 from the supply, the port 82 of the valve 10 is closed and the vent valve 100 thereof is opened. This cuts off pressure to the chamber 88 of the valve 20 and the valve 20 closes.

---

This invention relates to improved irrigation valving, and more particularly to improved irrigation stepping valving.

Another object of the invention is to provide improved irrigation stepping valving.

A further object of the invention is to provide a stepping valve which is easily converted from a direct, flow controlling valve to a pilot valve.

Another object of the invention is to provide a stepping valve having a semi-soft, cupped valve member slidable between open and closed positions relative to a main port in a valve housing, and a valve rod movable with the valve member is slidable between open and closed positions in a cupped valve body connected to the valve housing.

Another object of the invention is to provide a pilot controlled irrigation system in which a stepping valve is movable to an opening position supplying balancing pressure to one side of a diaphragm of a main valve to balance pressure of water on the other side of the diaphragm to open the main valve and the stepping valve is also movable to a closing position venting said one side of the diaphragm to close the main valve.

A further object of the invention is to provide a pilot operated irrigation valve having a valve head on a tubular valve stem normally pressed to a closed position by a spring urged rolling diaphragm supplied with line pressure on one side by the tubular stem and opened when water under line pressure is supplied to the other side of the diaphragm.

In improved irrigation valving forming one specific embodiment of the invention a main valve includes a diaphragm normally biased closed by supply water pressure, opened when supply water is supplied to the other side of the diaphragm by a pilot stepping valve and closed when the pilot valve vents said other side of the diaphragm. The diaphragm preferably is of the rolling type and the main valve preferably includes a tubular valve stem connecting the supply side of the valve to said one side of the diaphragm. The pilot stepping valve preferably is convertible for use as either a pilot valve or for direct control. The stepping valve preferably includes a valve member operable to close a vent valve connected to said other side of the diaphragm and a semi-soft sliding valve closure stiffened in its central section by a stiff sleeve, being cupped at its end to give check valve action and operatively connected to the valve member to close the vent valve while opening a main port of the stepping valve.

A complete understanding of the invention may be obtained from the following detailed description of an improved irrigation valving forming a specific embodiment thereof, when read in conjunction with the appended drawings, in which:

FIG. 1 is an elevation view of an improved irrigation valving from one embodiment of the invention;

FIG. 2 is a vertical section taken along line 2—2 of FIG. 1;

FIG. 3 is an enlarged, partially sectional view of a stepping valve of the irrigation valving of FIG. 1; and FIG. 4 is a vertical section taken along line 4—4 of FIG. 3.

Referring now in detail to the drawings, a pilot operated irrigation structure forming one embodiment of the invention includes a stepping valve 10 (FIG. 1), which is easily converted to act either as a pilot valve or to be used as a directly controlling valve in smaller irrigation systems than those in which the pilot operated structure disclosed herein is to be used. The valve 10 controls the operation of a large valve 20, which directly controls the flow of water to a sprinkler of the irrigation system. The valve 20 includes a valve body 22 (FIG. 2) which serves as a coupler from an irrigation conduit to a pipe 24 leading to a sprinkler (not shown) with a blocking wall 26 having a valve opening 28 and a valve seat 30. A spring 32 seated between an end of a socket 34 in a flanged, cupped cap 35 and a clamping disc 36 urges a tubular valve rod 38 downwardly to move a gasket 40 on a cupped disc 41 against the valve seat. The rod is slidable in a bushing 42 mounted in a hole 44 in a boss 46 of a wall portion 48 of the valve body 22, and the bushing carries an O-ring 50 in sealing engagement with the rod. A nut 52 on a threaded end portion 54 of the rod presses a rolling diaphragm 56 between the plate 36 and a flanged plate 58 bearing against a shoulder 60 on the rod. An O-ring portion 62 at the outer edge of the diaphragm is sealed between the flange cap 35 and a flange 64 of a tubular member 66 of the valve body.

A pipe 70 (FIG. 1) threaded into a port 72 of the valve body 22 connects an inlet 74 of the stepping pilot valve 10 and inlet chamber 78 (FIG. 2) of the valve body 22. When the valve 10 has been stepped the number of times for which it is set, it moves a valve closure member 80 (FIG. 4) from a position closing inlet 74 from outlet 82 upwardly to a position opening the inlet 74 to the outlet 82. Water under pressure of the irrigation supply line then flows out of the outlet 82 and through pipes 84 and 85 (FIG. 1) and a port portion 86 of the valve body 22 into a lower chamber 88 (FIG. 2), below the diaphragm 56. This balances the pressure on both the bottom and the top of the diaphragm, the top of the diaphragm being subjected to water under line pressure in upper chamber 90, which receives water from the inlet chamber 78 through the tubular rod 38. The pressure of the water on the bottom of the gasket 40 then is sufficient to overcome the force of the spring 32 and the opening 28 is opened, an adjustment screw 91 screwed into tapped bore 93 in the cap 35 serving to limit the extent the valve gasket 40 can be moved away from the seat 30.

On the next decrease in pressure of the water in the irrigation supply line, the valve closure member 80 (FIG. 4) is moved by a spring 92 to a position closing off the outlet 82 from the inlet 74, and the spring 92 also moves a headed valve rod 94 from a position closing a vent outlet 96 from an inlet 98 of a vent valve 100 to a position opening the inlet 98 to the outlet 96. The outlet 98 is connected to atmosphere so that pressure in the chamber 88 is relieved, the inlet 98 being connected to the pipe 85 (FIG. 1) by a pipe 102. The spring 32 (FIG. 2) and the pressure of the water in the upper chamber 90 then reclose the orifice 28 and keep it closed until the pilot valve 76 again steps to a position supplying water under pressure to the lower chamber 88 and simultaneously closes the vent valve 100. The effective area of the diaphragm 56 is much greater than that of the gasket 40 so that, with the force of the spring 32, whenever the water pressure in the inlet chamber 78 (and the upper chamber 90) is high and the chamber 88 is open to atmosphere, the gasket is strongly held in its orifice closing position. However, whenever the chamber 88 is closed off from atmosphere and is connected to the inlet chamber 78, the pressures on opposite sides of the diaphragm 56 are equal and only the spring 32 is effective to move the gasket 40 downwardly and the water pressure on the underside of the gasket 40 provides a force greater than that of the spring and moves the gasket to its fully open position, as limited by the adjustment screw 75.

The valve 10 (FIGS. 3 and 4) may be used either as a pilot valve as described above or for directly controlling flow for conventional size sprinkler irrigation. When used for the latter, the valve 76 may omit the vent valve 100, the headed valve rod 94 and an O-ring 110, and a removable cap 112 of the valve 76 need not have a clearance bore 141 passing through a centering boss 116 of the cap. This structure permits the valve to be made for the direct control and converted to a pilot valve merely by forming the bore 114, installing the rod 94 and cementing the vent valve 100 to the top of the cap, the valve 100 and the cap being formed of a tough plastic material. The valve 76 includes a replaceable ratchet wheel 120, which is held on a bearing sleeve 122 by a nut 124.

The ratchet wheel 120 (FIG. 4) is stepped each time the pressure is reduced in the inlet 74 by a piston (not shown) in a cylinder 126 (FIG. 3), and has a cam groove or track 128 into which follower pins 130 (FIG. 4) of dogs 132 project. Whenever water under pressure is supplied to the inlet 74, the water under pressure travels through a passageway 133 from the inlet 174 into one end of the cylinder 126 and moves the piston (not shown) upwardly in the cylinder 126 to move a pawl (not shown) to a cocked position relative to the ratchet wheel 120. Then when the pressure on the water in the supply line is reduced, a spring (not shown) in the cylinder 126 returns the piston and the pawl to move the pawl in a feed stroke to turn the ratchet wheel 120 one step. Thus, each time the water pressure is dropped, as by stopping the pump supplying the system, the valve 10 is stepped. Normally the cam track 128 holds the dogs in positions in the path of a rigid slide member 134 carrying the valve member 80 which is semi-flexible to hold a rim 136 of an expansible cupped portion in a cylindrical restricted portion 138 of an inlet passage 140 of a valve body or housing 141. The cam track moves the dogs 132 out of blocking positions upon the desired number of steps of the ratchet wheel, and water pressure on the end of the member 80 moves the member to open position against the action of the spring 92. The member 80 is of a semi-flexible plastic, and the rim of the cupped portion acts like a pump leather and is expanded by water pressure into sealing engagement with the restricted portion 138. To keep the member 80 from being flexed by water flow out of alignment with the restricted portion 138, a longitudinally ribbed stiffener sleeve 150 of plastic is provided. A rolling diaphragm 152 having an O-ring rim 153 compressed between a shoulder 154 and a liner 156 and sealed to the slide member 134 seals the passage 140 from the upper portion of the valve body. The valve 10 is operated by a damped piston construction substantially identical with the damped piston construction of the valve 100 of Gheen Patent 3,145,736. The ratchet wheel 120 is replaceable to provide a different cam track by removing the nut 124. A cupped spring seat 160 (FIG. 3) is held in the sleeve 156 by the cap 124, which may be cemented to the valve body. The lower end of the spring 92 bears on head 162 of the valve rod 94. A slight opening 170 is provided for observing indicia on the ratchet wheel, and may be closed by a plug 172.

The stepping valve 10 may be easily converted from a directly controlling valve for smaller sprinklers to a pilot valve for larger sprinklers merely by inserting the valve rod 94 and cementing the vent valve 100 to the cap 124. Or, if desired, the valve may be used as shown to control flow of water from its main port directly to a sprinkler. The main valve 20 is simple, inexpensive and rugged in construction and sure in its operation. Also, the system insures closing of the main valve by venting the balancing chamber whenever the supply water pressure is cut off.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In an irrigation system,
   a main valve having a supply side and a discharge side and differential pressure means having a balancing portion and adapted to open the valve when supplied with water under pressure,
   pilot stepping valve means having a vent valve, a supply port, a main port and means for simultaneously opening the vent valve and closing the main port from the supply port and simultaneously closing the vent valve and opening the main port to the supply port,
   means connecting the supply side of the main valve to the supply port of the stepping valve means, said stepping valve including means responsive to a predetermined plurality of pressure pulses at the supply side of the main valve for opening the main port and closing the vent valve,
   and means connecting the main port of the stepping valve means and the vent valve to the balancing portion of the differential pressure means to supply water under pressure thereto from the supply side when the vent valve is closed and the main port is open.

2. The irrigation system of claim 1 wherein the main valve includes:
   a valve opening between the supply side and the discharge side,
   a valve member adapted to close the valve opening,
   a tubular valve rod connected to the valve member and open at one end to the supply side of the main valve,
   diaphragm housing means surrounding the other end of the tubular valve rod,
   diaphragm means on the rod and in the housing means dividing the housing means into an actuating chamber open to said other end of the rod and a balancing chamber closed to the rod and connected to the vent valve and the main port.

3. The irrigation system of claim 2 wherein the diaphragm means includes a rolling diaphragm and a pair of plates clamped to the rolling diaphragm and secured to the rod.

4. The irrigation system of claim 2 including an adjustment screw in the path of the rod and adapted to limit opening movement of the rod.

5. The irrigation system of claim 1 wherein the main valve means includes a housing having a pilot port connecting the supply side to the inlet port of the stepping valve means.

6. The irrigation system of claim 5 wherein the housing includes a tubular main portion, a partition portion in the main portion having a valve opening facing one side of the main portion, an exterior cupped portion aligned with the valve opening and a guide opening in the portion of the wall of the main portion surrounded by the cupped portion,
- a cupped housing member,
- diaphragm means clamped between the cupped housing member and the exterior cupped portion to define an actuating chamber with the cupped housing member and a balancing chamber with the exterior cupped portion,
- a valve stem connected to the diaphragm means and extending through the guide opening to the valve opening,
- a valve head on the valve stem,
- and means connecting the supply side of the main valve to the actuating chamber.

7. The irrigation system of claim 6 including a spring in the cupped housing member urging the diaphragm means toward the valve opening.

8. The irrigation system of claim 7 wherein the diaphragm means comprises a rolling diaphragm including a beaded peripheral portion,
- the exterior cupped portion and the cupped housing member including opposed flanges clamped against and sealed to opposite sides of the beaded peripheral portion of the diaphragm.

9. The irrigation system of claim 6 wherein the valve stem is tubular and open at opposite ends to the actuating chamber and the valve opening.

10. The irrigation system of claim 6 wherein the cupped housing member includes a central, tapped hole aligned with the valve stem,
- and an adjustment screw screwed into the threaded opening for limiting opening movement of the valve stem.

References Cited
UNITED STATES PATENTS

| | | | |
|---|---|---|---|
| 1,606,245 | 11/1926 | Lang | 239—66 X |
| 2,372,324 | 3/1945 | Hauser | 239—66 X |
| 3,066,688 | 12/1962 | Young | 251—230 X |
| 3,145,736 | 8/1964 | Gheen | 251—230 X |

ALAN COHAN, Primary Examiner

U.S. Cl. X.R.

239—66; 251—25, 230